Oct. 14, 1952 E. MOSS 2,613,574
SLIDE PROJECTOR-SOUND SYNCHRONIZATION SYSTEM
Filed Sept. 27, 1949 3 Sheets-Sheet 1
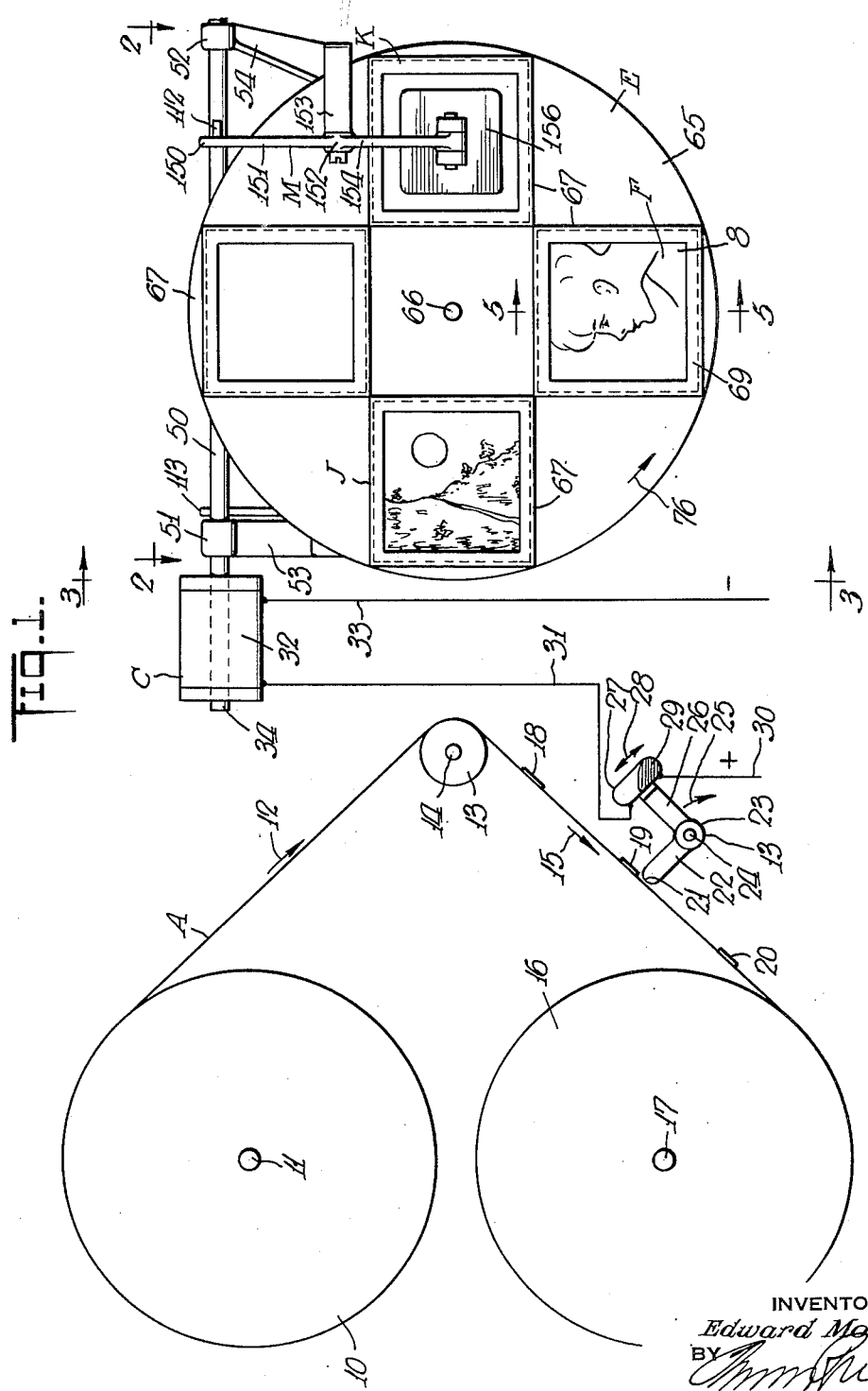
INVENTOR
Edward Moss
BY
ATTORNEY

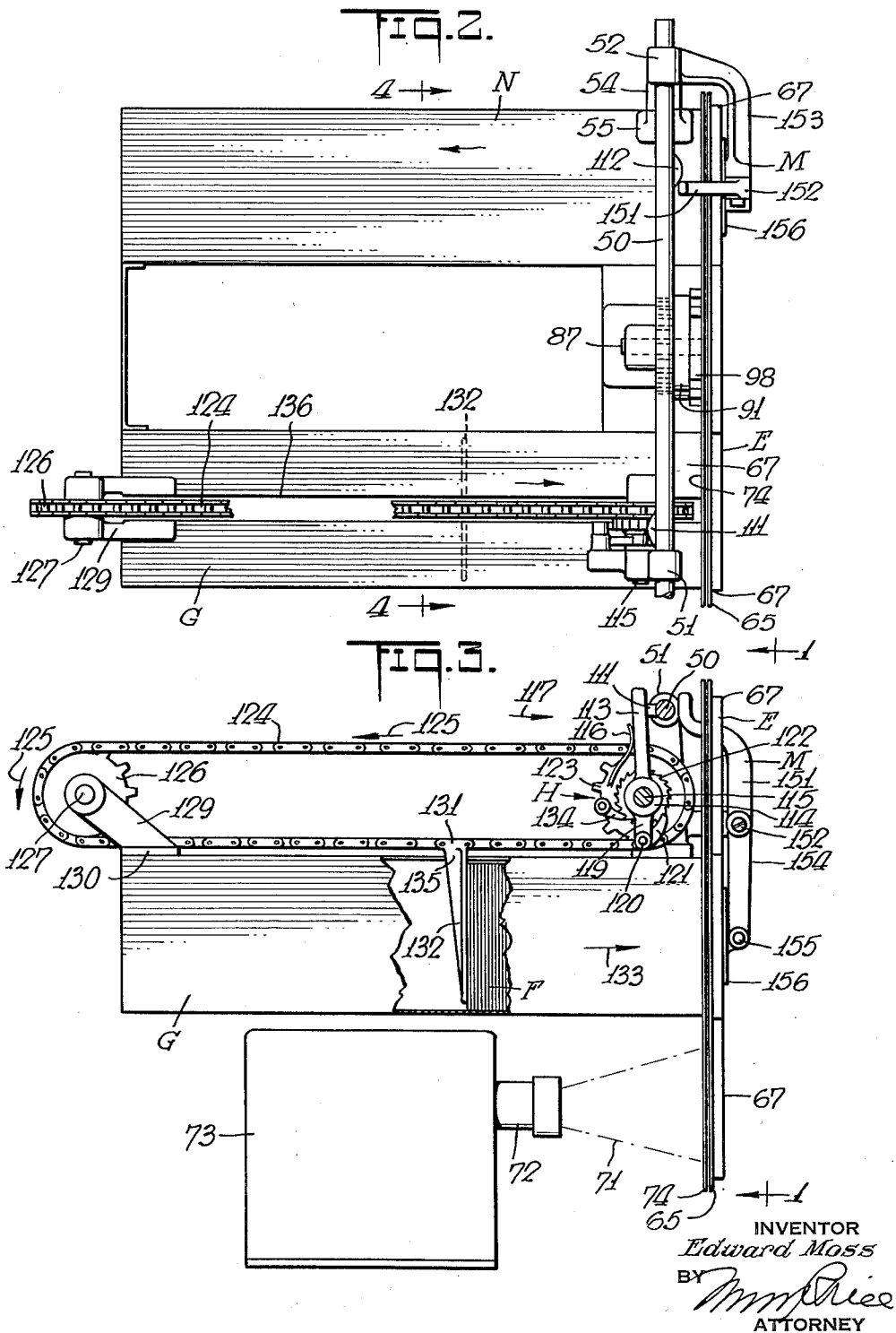

Oct. 14, 1952     E. MOSS     2,613,574
SLIDE PROJECTOR-SOUND SYNCHRONIZATION SYSTEM
Filed Sept. 27, 1949     3 Sheets-Sheet 3
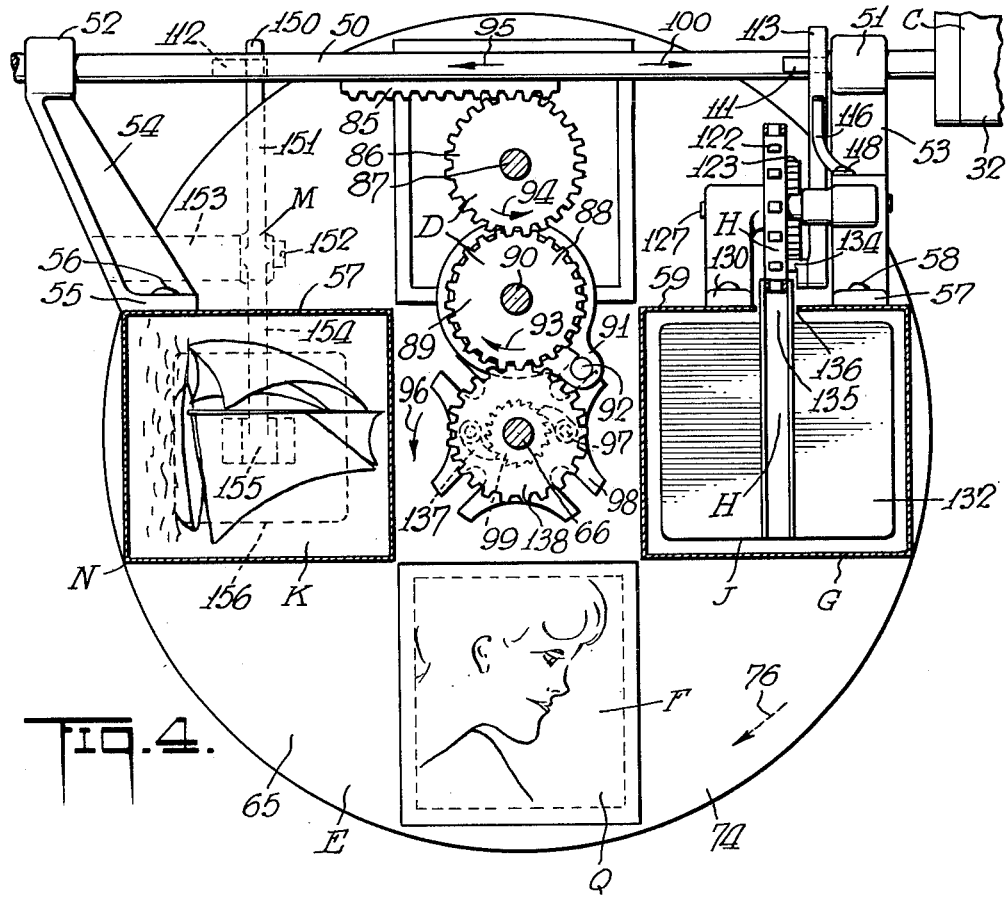
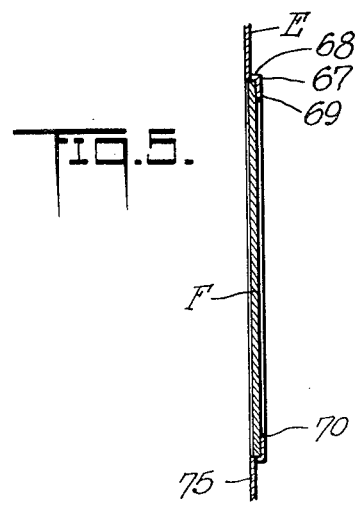
INVENTOR
*Edward Moss*
BY
ATTORNEY Patented Oct. 14, 1952

2,613,574

UNITED STATES PATENT OFFICE 2,613,574

SLIDE PROJECTOR-SOUND SYNCHRONIZATION SYSTEM

Edward Moss, New York, N. Y.

Application September 27, 1949, Serial No. 118,163

7 Claims. (Cl. 88—28)

The present invention relates to a slide projector-sound synchronization system and it particularly relates to a system by means of which it is possible to provide a household apparatus for simultaneous and synchronized projection of amateur or professional slides together with a sound track or sound record.

It is among the objects of the present invention to provide a simple, durable, readily installed and operated, easily repaired apparatus for installation in the home, factory or office and which also may be utilized for industrial purposes, which will project slides either of amateur or professional nature and synchronize the projection of such slides together with sound recording.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a diagrammatic side plan view of the system for synchronizing the sound of and projection of the slides according to one embodiment of the present invention.

Fig. 2 is a top plan view showing the receptacles for receiving the slides for feeding and removing the slides to the projecting apparatus or device upon the line 2—2 of Fig. 4.

Fig. 3 is a side vertical elevational view upon the line 3—3 of Fig. 4, showing the feeding magazine together with the light projector.

Fig. 4 is a transverse vertical sectional view taken upon the line 3—3 of Fig. 2.

Fig. 5 is a transverse vertical sectional view taken upon the line 5—5 of Fig. 1 and upon an enlarged scale as compared to Fig. 1, to more clearly show the film holder arrangement.

Referring to Figs. 1 to 5, there is shown by way of illustration a tape arrangement A which may consist of a magnetized steel or metal strip or transparent film strip with a sound track photograph thereon.

This strip will actuate a sound projector (not shown) and also a switch B which will actuate the slide projection apparatus.

The switch B operates the solenoid motor C which in turn, through the gear train D, turns the slide carrier E intermittently to move different slides F to projection position.

At the same time these slides before projection are held in a receiver G and are moved by the mechanism H, one at a time, to position J on the slide carrier E. At the same time they are removed from position K after projection by the mechanism M into the receiver N for the projected or used slides.

Referring to Fig. 1, the recording tape or wire A moves from the drum or reel 10 which turns on the shaft 11 in the direction 12 to the guide roll 13 turning on the shaft 14. It then moves, as indicated by the arrow 15, onto the take-up drum 16 and the shaft or axis 17.

The tape A, as shown, has a series of projections or cam elements 18, 19 and 20 jacked upon the end 21 of the arm 22 of the lever 23. The lever 23 forms part of the switch mechanism B and it is pivotally mounted on the shaft 24 and is biased in direction 25.

Carried on the arm 26 is the mercury switch 27 which reciprocates as indicated at 28.

When the arm 22 is thrown to the left by the cam elements 18, 19 and 20 on the tape A, the mercury 29 will establish a circuit from the electrical line 30 to the electrical line 31 and through the coil 32 to the solenoid C and back to the line 33. This will result in a reciprocatory movement of the armature 34 upon each passage of cam 18, 19 and 20 over the arm 22.

The armature 34 operates the shaft or operating bar 50 having bearings at 51 and 52.

The bearings 51 and 52 are carried on the arms or brackets 53 and 54. The bracket 54 is mounted by the pivot 55 and the rivet or screw 56 upon the wall 57 of the casing N for receiving the projected slides.

The bracket 53 is mounted by the foot 57 and the rivet or screw 58 upon the wall 59 of the casing G for receiving the slides to be projected.

The rotatable slide carrier E consists of a metal or plastic disk or plate 65 having a pivot shaft at 66 by which it rotates.

The disk 65 is provided with four or more pockets 67 which have a depth, as indicated at 68, of about the same thickness as the slides F so as to receive the slides F. These pockets are also provided with inwardly directed flanges 69 which terminate at 70 so as to leave a central space so that the opening of the slide may be projected by the beam of light 71 from the lens system 72 of the light source 73 (see Figs. 3 and 5).

The presser plate 74 may be positioned closely adjacent to the inside face 75 of the plate 65 so as to hold said slides in position in the pockets 67 as the plate 65 turns in the direction 76.

The plate 65 is turned by the mechanism D, as shown best in Fig. 4.

As shown in Fig. 4, the shaft or actuating rod 50 is provided with a rack 85 which turns the pinion 86 on the shaft 87. The pinion 86 in turn meshes with the pinion 89 which turns upon the shaft 90.

On the shaft 90 there is provided a wheel 88 which caries a lug 91 with the pin 92. The pin 92 when driven in the direction 93 upon turning of the gear 86 in direction 94 and rod 50 in direction 95 will turn the Geneva wheel 98 will drive the ratchet 99 one-quarter turn, turning the shaft 66 one-quarter turn. This will move the new slide from receiving position J to projecting position Q and will move the old slide from projecting position Q to removal position K.

Upon reverse movement of the rod 50 in direction 100, the gears 68 and 69 will be turned in the opposite direction and the pin 92 will turn the Geneva wheel backwardly a quarter turn, with the pawl 97 sliding over the teeth of the ratchet 99. This movement will not affect the shaft 66 since the pawl 97 will snap over the teeth of the ratchet wheel 99.

The rod 50 is provided with two cams 111 on one side thereof and 112 on the other side thereof, respectively, to actuate the feed mechanism H and the removal mechanism M.

The cams 111 and 112 are so positioned in respect to the rack 85 that the feed mechanism H and removal mechanism M will not be actuated when the rack is driving the shaft 66.

In respect to the feed-in mechanism, the cam 111 will act upon and move the lever 113 which is pivotally mounted by the hub 114 on the shaft 115. The spring 116 will press the lever 113 in the direction 117 against the cam 111. The spring 116 is mounted at 118 upon the bracket 53.

The lever 113 has an extension 119 which has a pivot 120 for the driving pawl 121. The driving pawl 121 drives the ratchet 122 which in turn drives the sprocket 123. The chain 124 is operated by the sprocket 123 and is moved intermittently in the direction 125 when said sprocket 123 is driven by the ratchet 122.

The chain 124 engages the sprocket wheel 126 which turns on the shaft 127 mounted on the bracket 129. The bracket 129 is mounted by the foot 130 on the casing G for the slides F.

Projecting downwardly from the chain at 131 is the follow-up plate 132 which presses the slides F one at a time in the direction 133, causing them to be received in the empty pockets 67 at position J on the rotating carrier E. The pawl 134 acts as a retent to prevent reverse movement of the ratchet 122 upon the reverse movement of the driving pawl 121.

The presser plate 132 has a neck portion 135 which fits into the slot 136 in the casing G.

The ejection or removal mechanism M is best shown in Figs. 1, 2 and 3.

The upper portion 150 of the lever 151 is actuated by the cam 112 on the rod 50. The lever 150 is pivotally mounted at 152 upon the bracket portion 153 which extends from the bracket 54. The lever 151 has a lower extension 154 which is pivotally connected at 155 to the presser plate 156. The presser plate 156 serves to remove the projected slide from position K into the receiver N.

In operation, the tape A will be fed steadily from the reel 10 to the reel 16, and as it passes over the roller 13 the projections 18, 19 and 20 will actuate the arm 22 of the lever 23, causing the circuit through the mercury 29 as each projection 18, 19 and 20 passes the switch position B. This will actuate the solenoid or other motor C to reciprocate the rod 50. In operation, the reciprocation of the rod 50 through the gears 86 and 89 of the Geneva motion 98 and the ratchet 99 will turn the slide carrier E one-quarter turn. Before or after the slide carrier has been turned one-quarter turn, the cams 111 and 112 will cause the feed mechanism H of the removal mechanism M to respectively insert a new slide at position J and removed the old slide from position K. This synchronization is obtained by proper positioning of the cams 111 and 112 in respect to the rack 85.

Return movement of the rod 50 will not affect any movement of the carrier 65, nor the feed mechanism H, in view of the ratchets 99 and 122. It is not necessary to provide a ratchet connection for the removal mechanism M since a second movement of the presser plate 156 at position K will not cause any difficulty since the slide will already have been removed from position K. The magazines N and G are desirably provided with longitudinal springs so as to lightly hold the slides in vertical position therein and the slides will be retained in the magazine N after they have been forced thereinto by the presser plate 156 on the removal apparatus M. The face plate 74 will keep the slides in position as they move from insert position J to projection position Q and from projection position Q to expulsion position K.

When the slides in the magazine G have all been transferred to the magazine N, a new set of slides may be inserted in the magazine G after the presser plate 132 is thrown backwardly upon release of the ratchet 122 and the detent pawl 134.

It is thus apparent that the applicant has provided a simple, inexpensive, reliable mechanism with simultaneous, synchronized projection of slides and sound which is adapted for the office, household or factory and may be used for instruction or entertainment. The pockets 68 may be arranged and formed to receive any type of slide, as may also the magazines G and M.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A synchronized film slide and sound projector system comprising a carrier for the slides to move them to and from projection position, means to insert and remove slides from said carrier, a sound track having spaced actuating elements, a motor actuated by said actuating elements, and in turn actuating said carrier and means, and a reciprocating bar having a central rack for causing intermittent movement of said carrier and having cams to actuate said inserting and removing means.

2. A synchronized film slide and sound projector system comprising a carrier for the slides to move them to and from projection position, means to insert and remove slides from said carrier, a sound track having spaced actuating elements, a motor actuated by said actuating elements and in turn actuating said carrier and means, magazines to feed the slides to said carrier and to receive used slides from said carrier, and a reciprocating bar having a central rack for causing intermittent movement of said carrier and having cams to actuate said inserting and removing means.

3. A synchronized film slide and sound projector system comprising a carrier for the slides to move them to and from projection position, means to insert and remove slides from said carrier, a sound track having spaced actuating elements, a motor actuated by said actuating elements and in turn actuating said carrier and means, said carrier taking the form of a rotatable disk having slide receiving pockets, and a reciprocating bar having a central rack for causing intermittent movement of said carrier and having cams to actuate said inserting and removing means.

4. A synchronized film slide and sound projector system comprising a rotatable carrier disk having four rectangular recesses 90° apart for the slides to move them to and from projection position, magazines positioned diametrically opposite to feed slides into and remove slides respectively from recesses 180° apart, each magazine being provided with a reciprocating pusher means to insert and remove slides from said carrier, a sound track having spaced actuating elements, a motor actuated by said actuating elements and in turn actuating said carrier and means, said motor taking the form of a solenoid having a reciprocating armature and there also being provided a swinging mercury switch actuated by said actuating elements in turn, and a reciprocatory bar actuated by said solenoid having cams thereon to actuate said means to insert and remove said slides.

5. A combination sound track-film slide projector comprising a sound track having a plurality of cam-like projections at intervals corresponding to the recorded sound, a switch actuated by said projections, a solenoid operated by said switch including a reciprocatory armature, supply and exhaust magazines to hold the film slides before and after projection, a rotatable disk having pockets to receive said slides and carry them between said magazines and to projecting position, lever arrangements to feed slides from the supply magazine and to the exhaust magazine in respect to said carrier and a gear train driven by said rack to move said disk intermittently, and a cam arrangement to operate said lever arrangements, said cam arrangement being actuated by said solenoid.

6. In a synchronized sound and slide projection machine of the type having a projection lantern at a high projection position, a metallic tape carrying a sound track, a reciprocable switch, said track having spaced means to actuate said switch at intervals to synchronize the sound with the slides and cause the slides successively to be supplied, moved into projection position, withdrawn from projection, and removed; the combination therewith of a slide handling mechanism comprising a feed magazine carrying a plurality of slides, a second magazine carrying the slides after projection, a rotatably mounted slide-carrying disk having 90° apart-spaced pockets each to receive one of said slides and to carry it from the feed magazine to projection position and from projection position to the second magazine, a follower in said feed magazine to press said slides toward said disk, a chain to move said follower, a pair of sprocket wheels to carry said chain, a drive ratchet to drive one of said sprocket wheels in a stepwise movement, a Geneva wheel movement to drive said disk, a gear train and rack to drive said Geneva wheel, a ratchet and pawl to prevent reverse rotation of the disk, a slide actuating lever to remove used slides from a pocket to the second magazine and a reciprocating solenoid drive to actuate said drive ratchet, said rack and said slide actuating lever.

7. A step-by-step drive for feeding, advancing and removing slides to, in and from a disk having a plurality of pockets receiving picture slides and carrying the slides from a feed magazine to projection position and from projection position to a second magazine comprising a reciprocating bar having a rack, a feed cam, and a removal cam, a Geneva movement to drive said disk actuated by said rack, means to transfer new slides from said feed magazine to said slide actuated by said feed cam, means to transfer used slides from said disk to said second magazine and a drive solenoid to reciprocate said bar.

EDWARD MOSS.

REFERENCES CITED

The following references are of record in the file of this patent:

UNITED STATES PATENTS

| Number | Name | Date |
|---|---|---|
| 637,904 | Swaab et al. | Nov. 28, 1899 |
| 757,737 | Green et al. | Apr. 19, 1904 |
| 1,002,078 | Paoli | Aug. 29, 1911 |
| 1,826,786 | Hopkins | Oct. 13, 1931 |
| 1,839,545 | Frye | Jan. 5, 1932 |
| 1,987,544 | Wood et al. | Jan. 8, 1935 |
| 2,151,629 | Wallis | Mar. 21, 1939 |
| 2,260,660 | Darwin | Oct. 28, 1941 |
| 2,475,439 | Waller et al. | July 5, 1949 |